March 23, 1948.   G. TONKIN   2,438,238
MOTOR VEHICLE DOOR LOCK
Filed Nov. 7, 1944   2 Sheets-Sheet 1

INVENTOR
GEORGE TONKIN
BY Virgil E. Woodcock
ATTORNEY

March 23, 1948. G. TONKIN 2,438,238
MOTOR VEHICLE DOOR LOCK
Filed Nov. 7, 1944 2 Sheets-Sheet 2

INVENTOR.
GEORGE TONKIN
BY Virgil E. Woodcock
ATTORNEY

Patented Mar. 23, 1948

2,438,238

UNITED STATES PATENT OFFICE 2,438,238

MOTOR VEHICLE DOOR LOCK

George Tonkin, Klamath Falls, Oreg.

Application November 7, 1944, Serial No. 562,322

2 Claims. (Cl. 292—182)

This invention relates to motor vehicle door locks and has for an object the provision of a relatively simple attachment by means of which the rear doors of a sedan may be positively locked in the closed positions upon closing of the front doors.

Four-door sedans have many advantages, including the ease of ingress and egress of passengers but in the case of small children, this very advantage may result in bodily harm. There have been many accidents caused by children playing with the door handles, with the car in motion. The door has actually been opened and in many cases when this occurred the door opened very rapidly due to air pressure against it. As a result the child was in effect quickly pulled from the inside of the automobile, frequently with serious consequences.

Though numerous schemes have been proposed to prevent the opening of the rear door, such schemes have not been foolproof; that is, they have required a manual or locking operation to be performed by the operator of the car. If the operator should believe he had locked the door, whereas in fact he had not, the danger is even greater because under such circumstances he assumes there is no possibility of accidents of the aforesaid character and, therefore, is not as watchful or alert to forestall serious accidents as he would otherwise be.

In carrying out the present invention in one form thereof, the rear doors of an automobile or motor vehicle are positively locked in the closed position upon the closing of the front doors. In accordance with the invention, it is impossible to open a rear door unless a front door is first opened. Consequently, there is no possibility for an unfortunate accident to occur. In accordance with the invention, the car owner has the advantages of the four-door type of car, with none of its disadvantages.

These advantages may be secured by a relatively simple latching mechanism. It comprises an attachment which may be applied to any automobile with a minimum of time and effort. Preferably, it comprises a spring biased latch or bolt, normally biased to a disengaged position. One end of the bolt cooperates with the front door so as to be bodily moved by the front door into the locking or latched position.

For a more complete understanding of the invention and for further objects and advantages thereof, reference should be had to the accompanying description taken in conjunction with the drawings, in which.

Figure 1:
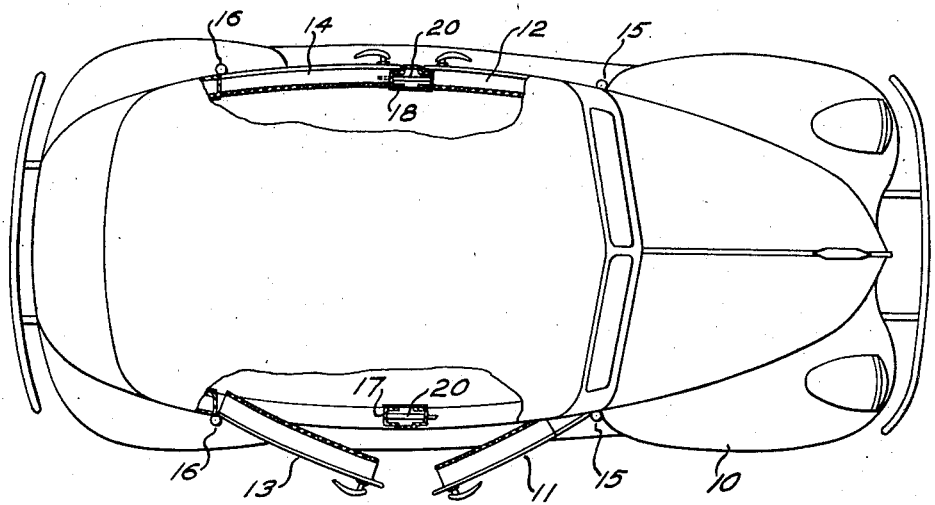
Fig. 1 is a plan view, partly in section, of an automobile to which the invention has been applied.
Figure 2:
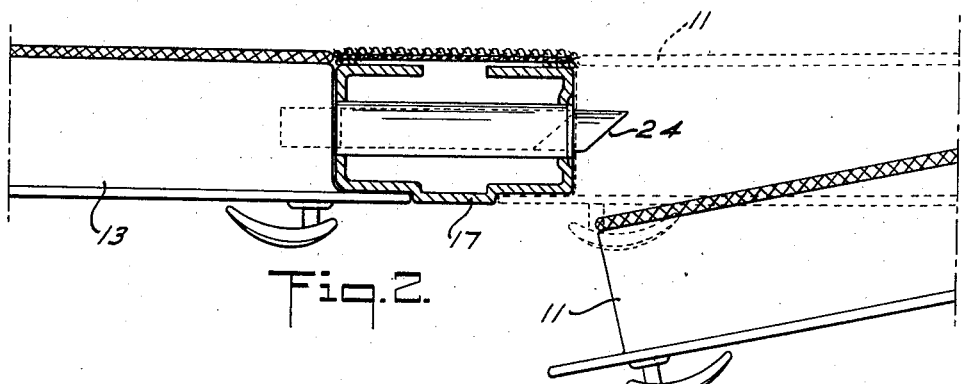
Fig. 2 is an enlarged plan view, partly in section, of the center post and two doors, the front door being shown in two positions.

Referring to Figs. 1 and 2, the invention in one form has been shown as applied to an automobile 10 having front doors 11 and 12 and rear doors 13 and 14. The front doors are hinged toward the front of the car by suitable means indicated at 15 whereas the rear doors 13 and 14 are hinged toward the rear of the car by suitable means as indicated at 16. The doors are provided with the usual handles and locking devices which cooperate with center posts 17 and 18.

In accordance with the invention, each center post is provided with an attachment 20 which consists of a light weight metal shell 21 provided with a mounting flange 22. A bolt or locking member 23 is slideably mounted within the shell 21. Its forward end is beveled as at 24 for actuation by one or the other of the front doors 11 or 12. As shown, a sleeve 25, of relatively short length, is secured to the outer shell 21 to form an abutment for a biasing spring 26, which encircles a smaller section 28 of the bolt or latch 23.

Figure 3:
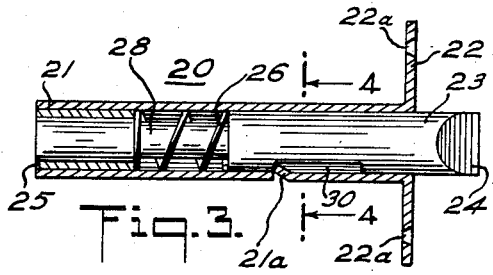
Fig. 3 is a side elevation, partly in section, of the attachment.
Figure 4:
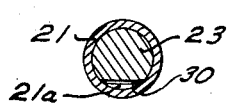
Fig. 4 is a sectional view taken on the line 4—4 of Fig. 3.
Figure 8:
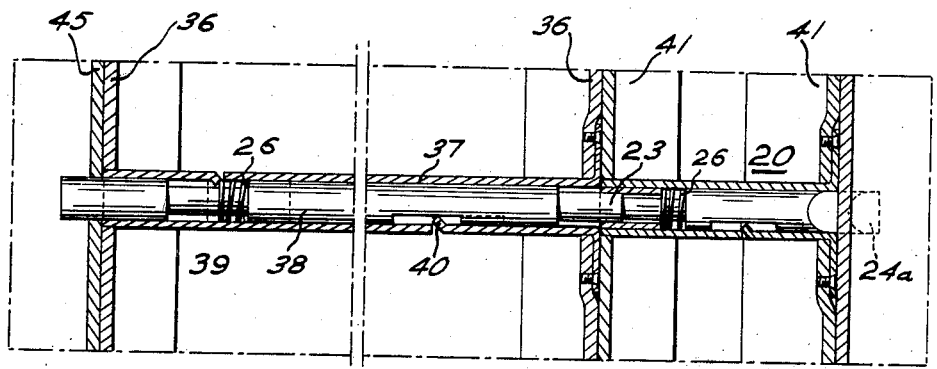
Fig. 8 is an enlarged plan view, partly in section, of the device of Fig. 7.
Figure 9:
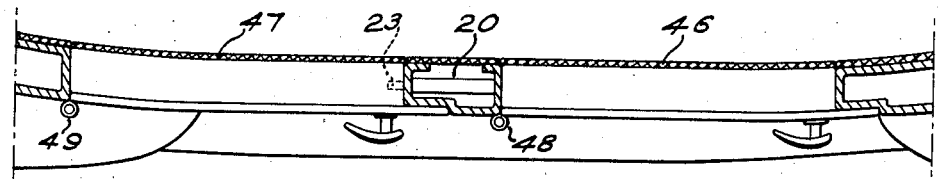
Fig. 9 illustrates the attachment of Figs. 1–4 as applied to automobile doors, both of which are hinged toward the rear of the car.

The latch or bolt 23 is journaled for sliding movement within the shell 21 and the sleeve 25 by engagement of the latched end portions. The right-hand end portion, as viewed in Fig. 3, is also provided with a rectangular slot or recess 30, the end walls of which form stops for limiting the movement of the latch or bolt 23. As shown, the spring 26 biases the left-hand wall of slot 30 against an inturned element or finger 21a. This finger 21a not only forms a stop for the latch or bolt 23 but its flat end surface is of sufficient width, as seen in Fig. 4, to hold the bolt or latch 23 from rotation with respect to the casing or shell 21. This attachment 20, as shown in Fig. 2, extends from one side of the center post 17 to the opposite side thereof. It is held in place by screws, as shown in Fig. 8, which extend through the openings 22a. With the door 11 in the open position, the spring 26 withdraws or retracts the locking end of the bolt or latch 23 from engagement with the rear door 13. Consequently, when the front door 11 is in the open position the rear door may be opened in the usual manner.

When the front door 11 is moved to its closed position, as shown by the broken lines, the leading end of the front door engages the inclined surface 24a, moving it inwardly to the position shown by the broken lines. This moves the opposite and locking end of the latch or bolt into a hole provided in the rear door 13, positively to lock it in closed position and to prevent movement thereof until the front door 11 has been opened and the spring 26 has again operated the latch or bolt 23 to its retracted position.

In Fig. 1 it will be seen the rear door 14 is locked in its closed position by reason of the operation by the front door 12 of the locking attachment 20 to its locking or engaging position. After the rear door 13 has been closed, the operation of the front door 11 to its closed position will lock the rear door 13 in manner already described in detail.

Figure 5:
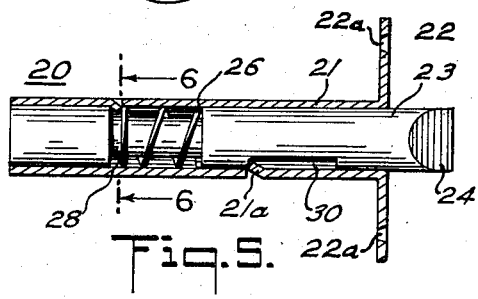
Fig. 5 is a side elevation, partly in section, of a modified form of the invention.
Figure 6:
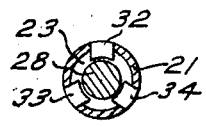
Fig. 6 is a sectional view taken on the line 6—6 of Fig. 5.

In accordance with the modified form of the invention, the sleeve 25 may be omitted and, as shown in Figs. 5 and 6, the left-hand end of the spring 26 may be seated against three inturned projections 32, 33 and 34. In accordance with this modification, the opposite ends of the latch or bolt 23 are of the same diameter, with a central portion of reduced diameter to make room for the spring 26 within the casing or shell 21.

It will be observed that in both forms of the invention, the parts may be made of relatively light weight or relatively thin metal stock. The parts lend themselves to quantity production as by stamping or drawing processes. In addition, the locking attachment as a whole is positive in operation, is foolproof, and may be readily applied to existing automobiles. The only requirement is that a hole be drilled in the rear door to accommodate the locking end of the bolt and that the center post be drilled to receive the attachment and the two screws which fasten it in place.

Figure 7:
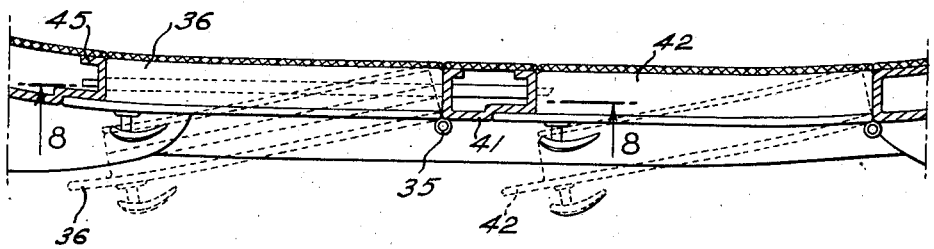
Fig. 7 is an enlarged plan view, partly in section, illustrating the invention as applied to doors of an automobile, both of which are hinged toward the front of the car.

Further in accordance with the invention, the rear door may be locked in position notwithstanding it is pivoted toward the front of the car or at the center post as indicated at 35 of Fig. 7. In accordance with this modification of the invention, there is provided across the rear door 36 a sleeve or casing 37 which encloses an elongated rod or bolt 38 having a length equal to the width of the door. A spring 39 biases the rod to the right, as viewed in Fig. 8, against a stop 40 provided to prevent movement beyond the right-hand edge of the door 36. The center post 41 is provided with an attachment 20 identical with the one disclosed in Figs. 1–4. When the front door 42 is moved to its closed position, it operates against the inclined surface 24 and moves it from its dotted line position to its full line position. The left-hand edge of the bolt 23 thereupon engages the right-hand end of the longer bolt 38 to move it to the left. The left-hand end of the bolt 38, as viewed in Fig. 8, thereupon moves into that part of the body structure 45 which carries the usual door locking device. In this manner, the rear door 36 is positively locked into its closed position whenever the front door 32 is closed.

In the event an automobile is provided with a front door 46 and the rear door 47, both of which are pivoted as at 48 and 49 toward the rear of the car, the locking attachment 20 is applied in the same manner as illustrated in Figs. 1–4. In this case, the rear portion of the door, the part near the hinging means 48, is utilized to operate the locking bolt 23 into locking position with respect to the rear door 47.

With the foregoing understanding of the several modifications of the invention, it is to be understood that other modifications may be made without departing from the invention as set forth in the appended claims.

What is claimed is:

1. An attachment for locking the rear door of an automobile in a closed position whenever the front door thereof is closed comprising a thin metal cylindrical casing, a cylindrical latching bolt slideably mounted within said casing, said bolt having an elongated flat surface, means for guiding said bolt and preventing rotation thereof comprising a finger having a flat end portion formed from said casing and bent inwardly into slidable engagement with said flat surface to prevent rotation of said bolt and to limit outward movement of said bolt relative to said casing, said casing having means for mounting the same adjacent said front door, said bolt having an inclined end engageable by said front door for displacement of said bolt from a door-opening position to a position for positive locking of said rear door in a closed position, said bolt having a reduced diameter along an intermediate portion thereof and a coil spring disposed in said intermediate portion for biasing said bolt to said door-opening position and against said finger.

2. An attachment for locking the rear door of an automobile in a closed position whenever the front door thereof is closed comprising a thin metal cylindrical casing, a cylindrical latching bolt slideably mounted within said casing, said bolt having a length intermediate the ends thereof of reduced diameter, a helical spring of about the diameter of said bolt and encircling said length of reduced diameter with one end thereof bearing against a shoulder formed by the length of larger diameter, at least one inturned finger formed from said casing for restraining the other end of said spring, said bolt having an elongated flat surface intermediate the ends thereof, means for guiding said bolt and preventing rotation thereof comprising a finger formed integrally with said casing and having a flat end portion disposed in sliding engagement with said flat surface, said casing having an attaching flange, and said bolt having an inclined end engageable by the front door for displacement of said bolt from a door-opening position to a position for positive locking of said rear door in a closed position.

GEORGE TONKIN.

REFERENCES CITED

The following references are of record in the file of this patent:

UNITED STATES PATENTS

| Number | Name | Date |
|---|---|---|
| 711,994 | Meigh | Oct. 28, 1902 |
| 1,310,600 | Blye | July 22, 1919 |
| 1,326,956 | Myers | Jan. 6, 1920 |
| 1,790,104 | Levitt et al. | Jan. 27, 1931 |
| 2,161,930 | Niswonger et al. | June 13, 1939 |
| 2,261,674 | Davelaar | Nov. 4, 1941 |
| 2,273,149 | Shannon et al. | Feb. 17, 1942 |

FOREIGN PATENTS

| Number | Country | Date |
|---|---|---|
| 186,996 | Switzerland | Feb. 1, 1937 |